Dec. 12, 1967  S. R. BENNETT ET AL  3,358,131
PHOTOGRAPHIC FLASHLAMP UNIT
Filed July 8, 1965
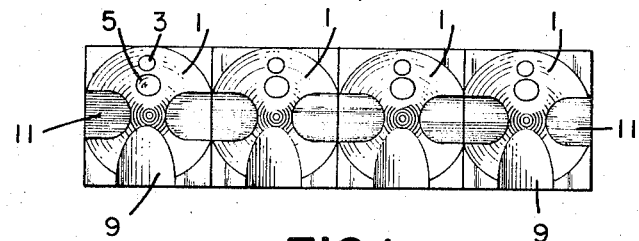
FIG.1
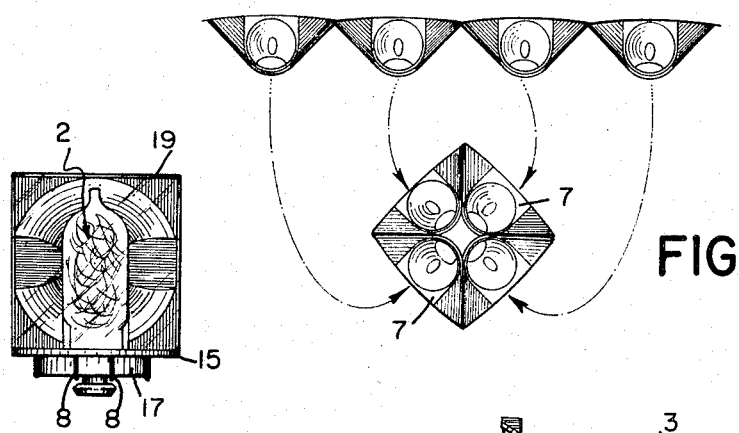
FIG.2
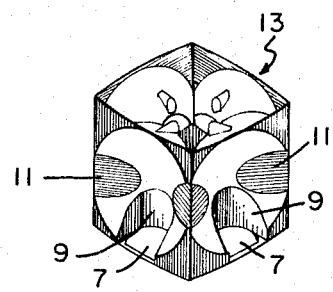
FIG.5
FIG.3
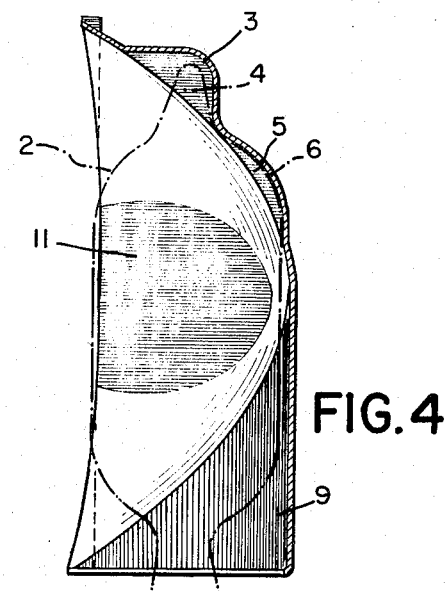
FIG.4
SEDGWICK R. BENNETT
DONALD W. HARTMAN
INVENTORS
BY *Joseph C. Ryan*
ATTORNEY ated Dec. 12, 1967

3,358,131
PHOTOGRAPHIC FLASHLAMP UNIT

Sedgwick R. Bennett, Williamsport, and Donald W. Hartman, Warrensville, Pa., assignors to Sylvania Electric Products Inc., a corporation of Delaware
Filed July 8, 1965, Ser. No. 470,524
5 Claims. (Cl. 240—1.3)

ABSTRACT OF THE DISCLOSURE

A flashcube in which each reflector thereof is provided with a recessed skirt portion in the bottom thereof partially encompassing the lower end of the lamp.

---

This invention relates to photographic flashlamps and more particularly to the use of these lamps with photographic equipment.

Over the years the advances made in photographic equipment and in photographic light sources have been many and significant, not the least of which has been miniaturization. Cameras have become more and more compact; and photoflash lamps have also become smaller and smaller. One of the goals in the photographic field, even when the cameras and the flashlamps were much larger than they are today, has been the provision of some means for conveniently, inexpensively and artistically providing cameras with some sort of a flashlamp attachment which will include a supply of flashlamps and some simple automatic or semi-automatic means for sequentially presenting these flashlamps to the center of a reflector for taking pictures. The patent literature is replete with examples and illustrations of the efforts which have been exerted over the years to attain this goal; and yet these units are conspicuous by their absence commercially, particularly insofar as highly popular inexpensive cameras are concerned.

The flashlamp attachments which have been proposed heretofore have failed of widespread commercial success and application because of one or more significant deficiency or undesirable characteristic. Many of them were too expensive relatively speaking with respect to the line of cameras with which they were designed to be used. Many others were too large and too cumbersome to handle and manipulate, particularly with respect to the size of the cameras with which they were designed to be used. Still others had relatively complicated and thus expensive means for effecting automatic or semi-automatic sequential advancement of the flashlamp to a reflector for the actual picture-taking; and these were never sufficiently free of mechanical failures and/or operating malfunctions to be generally accepted commercially. Others were difficult to load. In nearly all cases it was necessary for the user to load lamps individually in magazines or turrets.

As cameras have become smaller and more compact, and as flashlamps have become smaller, the cost of both to the consumer has also decreased. Thus the requirements for a commercially acceptable flashlamp attachment have become more stringent rather than less; it must be smaller because the cameras are smaller, it must be smaller because the lamps are smaller and, as always, it must be inexpensive, mechanically simple but positive and aesthetically in harmony with the camera with which it will be employed. The provision of such a unit is the stated object of the invention in the co-pending application of L. F. Anderson et al., Ser. No. 335,013, filed Jan. 2, 1964, entitled, "Photographic Flashlamp Unit" and assigned to the same assignee as this application.

In accordance with the teachings of that application, a plurality of reflectors is arranged to define an assemblage and a photoflash lamp is located in operative relationship with respect to each of said reflectors. In the specific embodiment of the invention illustrated in the drawing accompanying that application, each reflector is provided with two apertures, one through which the lamp is inserted to locate it within the reflector and the other through which the exhaust tip projects when the lamp has been positioned. Although this arrangement provided satisfactory means for accomplishing these purposes, it was not without adverse effects. It was noted, for example, that a significant amount of uncontrolled light escaped and was lost through the bottom aperture and a lesser quantity through the top aperture. Not only did this loss of light result in lowered efficiencies but it also constituted a source or distratcion. Another real problem was sympathetic ignition, i.e., the accidental ignition of one or more lamps in the same unit by radiation from a lamp in which combustion was occurring.

Thus the principal object of this invention is to provide an improved reflector-lamp arrangement for a photographic flashlamp unit of the type to which the referenced application is directed. It has been found that a substantial improvement can be obtained if the reflector is re-shaped and the apertures therein eliminated or reduced in size significantly. More particularly, it has been found that a substantial improvement can be obtained if the aperture provided for the exhaust tip is replaced by a dimple and the aperture through which a lamp is inserted to locate it within the reflector is provided with a skirt. In the co-pending applications of D. H. Pfefferle, Ser. No. 390,574, now Patent No. 3,315,070 and 390,618 now Patent No. 3,315,071, both filed Aug. 19, 1964, and both assigned to the same assignee as this application, it is suggested that the several lamps which comprise the unit be supported on a rigid base member independently of their respective reflectors but still located in cooperative relationship with respect thereto. In connection therewith, it has been found that the stability of the resultant structure can be improved, without adversely affecting the useful light output, by providing the reflector with another dimple, adjacent to the tip-receiving dimple, to receive the upper shoulder of the lamp. These two dimples contribute to the stabilization of the reflector-lamp assembly. A further improvement over the specific reflector illustrated in the above-identified Anderson et al. application is obtained by providing the sides thereof with a pair of 45 degree flats. These flats contribute significantly to the attainment of maximum space utilization without adversely affecting the useful light output.

In the specific embodiment of the invention illustrated in the accompanying drawing, FIGURE 1 is an elevational view of a strip of four reflectors embodying the features to which this invention is directed.

FIGURE 2 is a bottom view of the strip of FIGURE 1 before and after folding to define a substantially cubical unit.

FIGURE 3 is a perspective view of the cubical reflector unit.

FIGURE 4 is a vertical section through a reflector, on an enlarged scale, with a lamp shown in phantom disposed therein.

FIGURE 5 is a front elevational view of a photographic flashlamp unit having a lamp-reflector arrangement of the type shown in FIGS. 3 and 4.

Each of the reflectors 1 is essentially parabolic but modified to include the structural features mentioned above an described in detail below. As shown in FIGS. 1 and 4, the upper portion of each reflector 1 is provided with a dimple 3 to receive the exhaust tip 4 of a lamp 2 and a dimple 5 to receive the shoulder 6 of the lamp 2.

Placement of a lamp 2 in position in the reflector is effected by inserting it through an aperture 7 defined by the skirt 9 in the lower portion of the reflector. The sides of the reflector are provided with flats 11. As is apparent from an examination of FIG. 3 for example, adjacent flats of adjacent reflectors abut one another when a strip of four reflectors is folded to define a substantially cubical unit, thus insuring maximum space utilization.

Although the parabolic reflector was modified, as noted immediatly above, it has been found that these modifications have not resulted in any significant loss of reflector efficiency. For example, the dimple 3 for the exhaust tip 4 disturbs the contour of the reflector but yet the reflector efficiency is not adversely affected because of the relatively small modified area, much of which is behind the lamp and therefore nearly entirely masked anyway. With respect to the skirt 9, it eliminated backlighting as a practical problem and yet it did not cause any significant loss in reflector efficiency. This highly desirable result is probably due in large measure to the fact that substantially the only reflector surface that was modified to form the skirt is entirely behind the lamp and this surface is quite ineffective due to high absorbance through the lamp and reflectance at its surfaces.

A complete photographic flashlamp unit is shown in FIG. 5. In assembling the unit, four photoflash lamps 2 are mounted on a substantially square base or platform 15 with the pair of lead-in wires 8 extending from each lamp being wrapped tightly across an annular ring 17 on the bottom of the base 15 and anchored in holes provided for the purpose to thereby hold the lamps upright thereon. The cubical reflector unit 13 shown in FIG. 3 is then inserted into a transparent cover 19 and the reflector unit-cover assembly is then threaded over the lamps disposed upright on the base 15 until each lamp is disposed in its reflector as shown in FIG. 5. The cover 19 is then secured to the base 15 to thereby complete the assembly.

What we claim is:

1. A photographic flashlamp unit comprising: a base member; a plurality of substantially tubular flashlamps mounted on said base member with the longitudinal axis of each lamp being substantially perpendicular thereto; and a substantially parabolic reflector within which each of said lamps is disposed, said reflector having a recessed skirt portion in the bottom thereof partially encompassing the lower end of said lamp.

2. A photographic flashlamp unit comprising: a base member; a plurality of substantially tubular flashlamps mounted on said base member with the longitudinal axis of each lamp being substantially perpendicular thereto and each lamp having a constriction defining a shoulder terminating in an exhaust tip at the upper end thereof; and a substantially parabolic reflector within which each of said lamps is disposed, said reflector having a pair of dimples formed therein within which said exhaust tip and said shoulder respectively are disposed, and said reflector having a recessed skirt portion in the bottom thereof partially encompassing the lower end of said lamp.

3. A photographic flashlamp unit comprising: a base member; a plurality of substantially tubular flashlamps mounted on said base member with the longitudinal axis of each lamp being substantially perpendicular thereto and each lamp having a constriction defining a shoulder terminating in an exhaust tip at the upper end thereof; and a substantially parabolic reflector within which each of said lamps is disposed, the longitudinal axis of each of said lamps being substantially normal to the axis of its reflector, each of said reflectors having a pair of dimples formed therein above its axis and within which said exhaust tip and said shoulder respectively are disposed, and a recessed skirt formed therein below its axis and in the bottom thereof partially encompassing the lower end of said lamp.

4. A photographic flashlamp unit comprising: a base member; a plurality of substantially tubular flashlamps mounted on said base member with the longitudinal axis of each lamp being substantially perpendicular thereto; and a substantially parabolic reflector within which each of said lamps is disposed, the longitudinal axis of each of said lamps being substantially normal to the axis of its reflector, each of said reflectors having a recessed skirt formed therein below its axis and in the bottom thereof partially encompassing the lower end of said lamp, and a pair of flats formed therein along the sides thereof in substantially the same horizontal plane as the axis thereof and with the adjacent flats of adjacent reflectors abutting one another.

5. A photographic flashlamp unit comprising: a base member; a plurality of substantially tubular flashlamps mounted on said base member with the longitudinal axis of each lamp being substantially perpendicular thereto and each lamp having a constriction defining a shoulder terminating in an exhaust tip at the upper end thereof; and a substantially parabolic reflector within which each of said lamps is disposed, the longitudinal axis of each of said lamps being substantially normal to the axis of its reflector, each of said reflectors having a pair of dimples formed therein above its axis and within which said exhaust tip and said shoulder respectively are disposed, a recessed skirt formed therein below its axis and in the bottom thereof partially encompassing the lower end of said lamp, and a pair of flats formed therein along the sides thereof in substantially the same horizontal plane as the axis thereof and with the adjacent flats of adjacent reflectors abutting one another.

References Cited

UNITED STATES PATENTS

| | | | |
|---|---|---|---|
| 3,096,025 | 7/1963 | Prochnow | 240—1.3 X |
| 3,244,087 | 4/1966 | Anderson et al. | 240—1.3 X |
| 3,315,070 | 4/1967 | Pfefferle | 95—11 X |
| 3,315,071 | 4/1967 | Pfefferle | 95—11 X |

NORTON ANSHER, *Primary Examiner.*

FRED L. BRAUN, *Assistant Examiner.*